US012783218B2

(12) United States Patent
Murai et al.

(10) Patent No.: US 12,783,218 B2
(45) Date of Patent: Nov. 3, 2026

(54) SCHEDULING APPARATUS, TRAINING APPARATUS, SCHEDULER AND GENERATION METHOD

(71) Applicant: Preferred Networks, Inc., Tokyo (JP)

(72) Inventors: Shogo Murai, Tokyo (JP); Shinichiro Hamaji, Tokyo (JP); Gentaro Watanabe, Tokyo (JP); Mitsuru Kusumoto, Tokyo (JP); Riki Fukunari, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 862 days.

(21) Appl. No.: 18/059,569

(22) Filed: Nov. 29, 2022

(65) Prior Publication Data

US 2023/0168873 A1 Jun. 1, 2023

(30) Foreign Application Priority Data

Dec. 1, 2021 (JP) ................................ 2021-195326

(51) Int. Cl.
*G06F 8/41* (2018.01)
*G06N 20/00* (2019.01)

(52) U.S. Cl.
CPC .............. *G06F 8/41* (2013.01); *G06N 20/00* (2019.01)

(58) Field of Classification Search
CPC ......... G06F 8/41; G06F 8/4441; G06N 20/00; G06N 3/0464; G06N 3/10; G06N 5/01
See application file for complete search history.

(56) References Cited

U.S. PATENT DOCUMENTS

| | | | | |
|---|---|---|---|---|
| 2016/0274916 | A1 | 9/2016 | Kobayashi | |
| 2017/0046614 | A1* | 2/2017 | Golovashkin | G06N 3/082 |
| 2017/0132513 | A1* | 5/2017 | Yu | G06N 3/08 |
| 2020/0272901 | A1 | 8/2020 | Inoue et al. | |
| 2020/0348628 | A1 | 11/2020 | Hoffmann et al. | |
| 2021/0232902 | A1* | 7/2021 | Gupta | G06F 13/1673 |
| 2021/0304066 | A1* | 9/2021 | Tomioka | G06F 9/5066 |
| 2022/0066760 | A1* | 3/2022 | Chang | G06F 8/41 |
| 2022/0067518 | A1 | 3/2022 | Watanabe | |
| 2023/0024977 | A1 | 1/2023 | Watanabe | |

FOREIGN PATENT DOCUMENTS

| | | |
|---|---|---|
| JP | 2005-316785 | 11/2005 |
| JP | 2016-173793 | 9/2016 |
| JP | 2019-008444 | 1/2019 |
| JP | 2021-507418 | 2/2021 |

OTHER PUBLICATIONS

Tianqi Chen, et al., "Training Deep Nets with Sublinear Memory Cost", revised on Apr. 22, 2016.

(Continued)

*Primary Examiner* — Dong U Kim
(74) *Attorney, Agent, or Firm* — IPUSA, PLLC

(57) ABSTRACT

A scheduling apparatus includes at least one memory and at least one processor, and the at least one processor is configured to generate a schedule from a state specified based on received information. The generating includes causing the state to transition such that a process of transferring data from a memory is replaced with a recomputation process that obtains the data.

20 Claims, 14 Drawing Sheets

(56) References Cited

OTHER PUBLICATIONS

Mitsuru Kusumoto, et al., “A Graph Theoretic Framework of Recomputation Algorithms for Memory-Efficient Backpropagation”, revised on May 28, 2019.

Hiroya Kaneko, “Accelerating Deep Learning Workloads with the MN-Core Compiler”, Preferred Networks Research & Development, Oct. 14, 2021 version, published on Jun. 11, 2021,<URL:https://tech.preferred.jp/en/blog/mncore-compiler-1/>.

Olivier Beaumont et al., “Efficient Combination of Rematerialization and Offloading for Training DNNs”, University of Bordeaux, Inria Bordeaux South-West, Bordeaux, France, Sep. 30, 2021.

* cited by examiner

SCHEDULING APPARATUS, TRAINING APPARATUS, SCHEDULER AND GENERATION METHOD

CROSS-REFERENCE TO RELATED APPLICATIONS

This application is based upon and claims priority to Japanese Patent Application No. 2021-195326 filed on Dec. 1, 2021, the entire contents of which are incorporated herein by reference.

BACKGROUND

1. Technical Field

The present disclosure relates to a scheduling apparatus, a training apparatus, a scheduler, and a generation method.

2. Description of the Related Art

In a compiler device that generates machine code based on source code, from the viewpoint of reducing execution time and the amount of memory consumption, a technique of generating a schedule by determining an appropriate computation order, a recomputation point, and the like have been proposed.

On the other hand, schedules may have a significant effect on execution time depending on the configuration of a device in which the machine code is executed (for example, accelerator chips).

For example, in the case of an accelerator chip that takes time to access a specific large memory, the execution time may be increased by saving data to the specific large memory.

RELATED-ART DOCUMENTS

Patent Documents

Patent Document 1: Japanese Patent Application Laid-Open No. 2005-316785

SUMMARY

In the present disclosure, a schedule according to the configuration of the device on which the machine code is executed is generated.

A scheduling apparatus according to one aspect of the present disclosure includes at least one memory and at least one processor, and the at least one processor is configured to generate a schedule from a state specified based on received information. The generating includes causing the state to transition such that a process of transferring data from a memory is replaced with a recomputation process that obtains the data.

DETAILED DESCRIPTION

Hereinafter, each embodiment will be described with reference to the accompanying drawings. In the present specification and drawings, for devices having substantially the same functional configuration, the same functional configuration will be denoted by the same reference signs, and a repetitive description thereof will be omitted.

First Embodiment

<System Configuration of Data Processing System and Hardware Configuration of Server Device>

First, a system configuration of the entire data processing system and a hardware configuration of a server device according to the present embodiment will be described.

Figure 1:
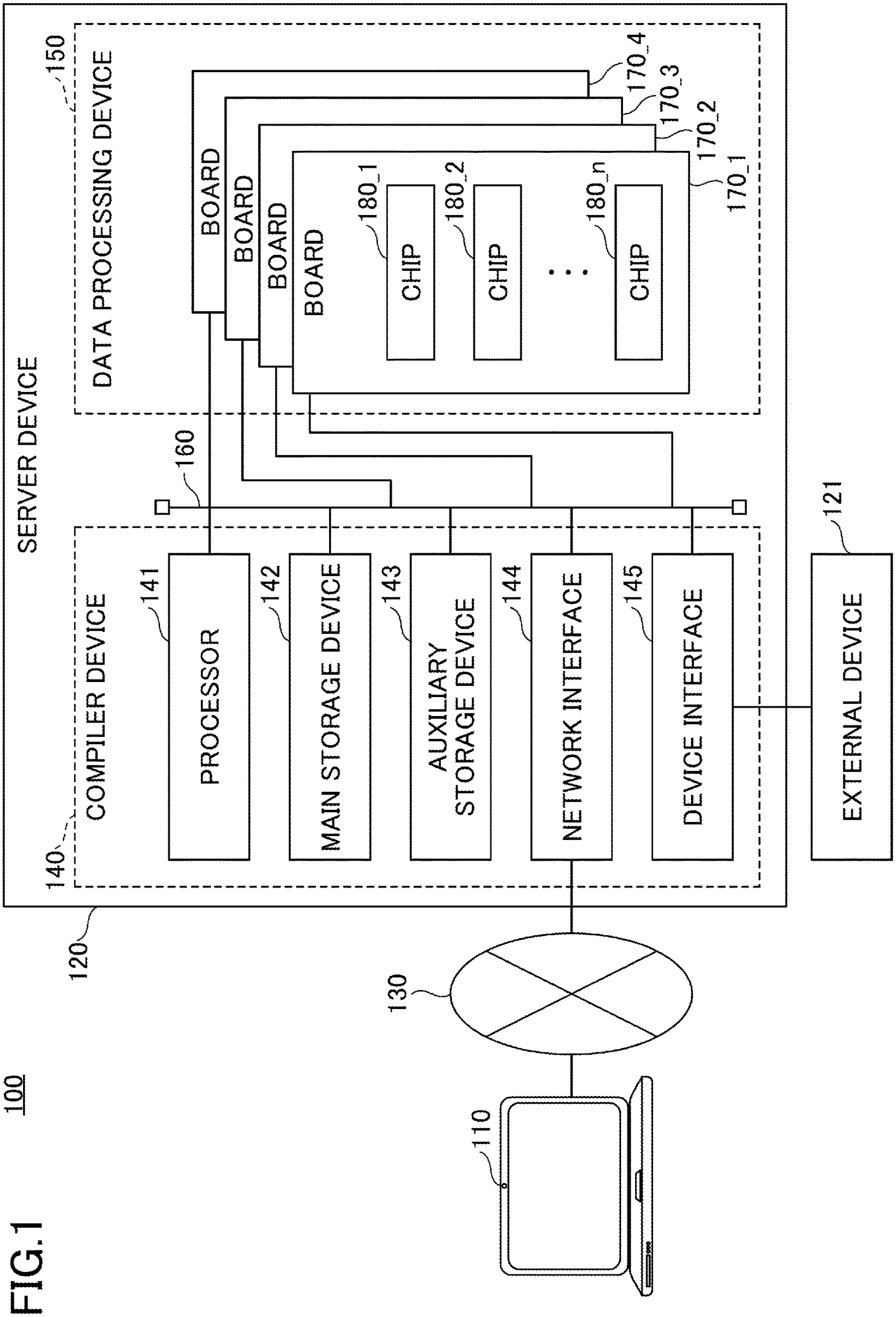
FIG. 1 is a diagram illustrating an example of a system configuration of a data processing system and a hardware configuration of a server device.

As illustrated in FIG. 1, a data processing system 100 according to the present embodiment may include a terminal device 110 and a server device 120. In the data processing system 100, the terminal device 110 and the server device 120 may be connected via a communication network 130.

The terminal device 110 may be a general-purpose computer, and according to the present embodiment, may be a device used by a user to generate source code. When an application for writing source code is installed in the terminal device 110 and the application is started, a script of the source code by a user may be started. When the script of the source code by the user is completed, the terminal device 110 may transmit the source code to the server device 120 through the communication network 130.

The server device 120 may include a compiler device 140 and a data processing device 150, as illustrated in FIG. 1.

The compiler device 140 includes, for example, a processor 141, a main storage device (memory) 142, an auxiliary storage device (memory) 143, a network interface 144, and a device interface 145. The compiler device 140 may be implemented as a computer with these devices connected via a bus 160.

The processor 141 may be an electronic circuit (such as a processing circuit, a processing circuitry, a CPU, a GPU, an FPGA, or an ASIC). The processor 141 may also be a semiconductor device or the like that includes dedicated processing circuitry. The processor 141 is not limited to an electronic circuit that uses an electronic logic element, but may be implemented by an optical circuit that uses an optical logic element. The processor 141 may have a computing function based on quantum computing.

The processor 141 may perform various operations based on various data and instructions that are input from devices provided internally as components in the compiler device 140, and may output operation results and control signals to the devices. The processor 141 may control the devices provided by the compiler device 140 by executing an operating system (OS), an application, or the like.

The processor 141 may also refer to one or more electronic circuits provided on one chip, or may refer to one or more electronic circuits disposed on two or more chips or two or more devices. When multiple electronic circuits are used, each electronic circuit may communicate by performing wired communication or wireless communication.

The main storage device 142 may be a storage device that stores instructions and various data executed by the processor 141, and the various data stored in the main storage device 142 may be read by the processor 141. The auxiliary storage device 143 may be a storage device other than the main storage device 142. Each of these storage devices may be any electronic component that can store various kinds of data, and may be a semiconductor memory. The semiconductor memory may be either a volatile memory or a non-volatile memory. The storage device that stores various data in the compiler device 140 may be implemented by the main storage device 142 or the auxiliary storage device 143, or may be implemented by an internal memory incorporated in the processor 141.

The network interface 144 may be an interface that connects to the communication network 130 by wireless or wired communication. An appropriate interface, such as an interface that conforms to an existing communication standard, may be used for the network interface 144. The communication network 130 may be any one or a combination of a wide area network (WAN), a local area network (LAN), a personal area network (PAN), or the like. An example of the WAN may be the Internet, an example of the LAN may be IEEE 802.11 or Ethernet, and an example of the PAN may be Bluetooth® or near field communication (NFC).

The device interface 145 may be an interface, such as a USB that directly connects to an external device 121.

The external device 121 may be, for example, an input device. The input device may be, for example, a camera, a microphone, a motion capture, various sensors, a keyboard, a mouse, a touch panel, or the like, and provides the acquired information to a computer. The input device may also be a device that includes an input unit, a memory, and a processor, such as a personal computer, a tablet terminal, or a smartphone.

The external device 121 may be, for example, an output device. The output device may be, for example, a display device such as a liquid crystal display (LCD), a cathode ray tube (CRT), a plasma display panel (PDP), and an organic electroluminescent (EL) panel or a speaker that outputs voice or the like. The output device may also be a device that includes an output unit, a memory, and a processor, such as a personal computer, a tablet terminal, or a smartphone.

The external device 121 may be a storage device (memory). For example, the external device 121 may be a storage device such as an HDD. The external device 121 may also be a device having a function of a component of the compiler device 140. That is, the computer may receive a part or all of the processing results of the external device 121.

The data processing device 150 according to the present embodiment may include multiple boards (boards 170_1 to 170_4) for each device. The boards 170_1 to 170_4 may carry multiple accelerator chips (for example, chips 180_1 to **180_*n***).

As illustrated in FIG. 1, each device of the compiler device 140 and each device of the data processing device 150 are connected via the bus 160. In the example of FIG. 1, the case in which the data processing device 150 includes four boards 170_1 to 170_4 is illustrated, but the number of boards of the data processing device 150 may be selected appropriately.

The chips 180_1 to **180_*n* are, for example, dedicated chips specialized for a learning phase of deep learning. The details of the chips 180_1 to 180_*n*** will be described later.

<Accelerator Chip Hardware Configuration>

Figure 2:
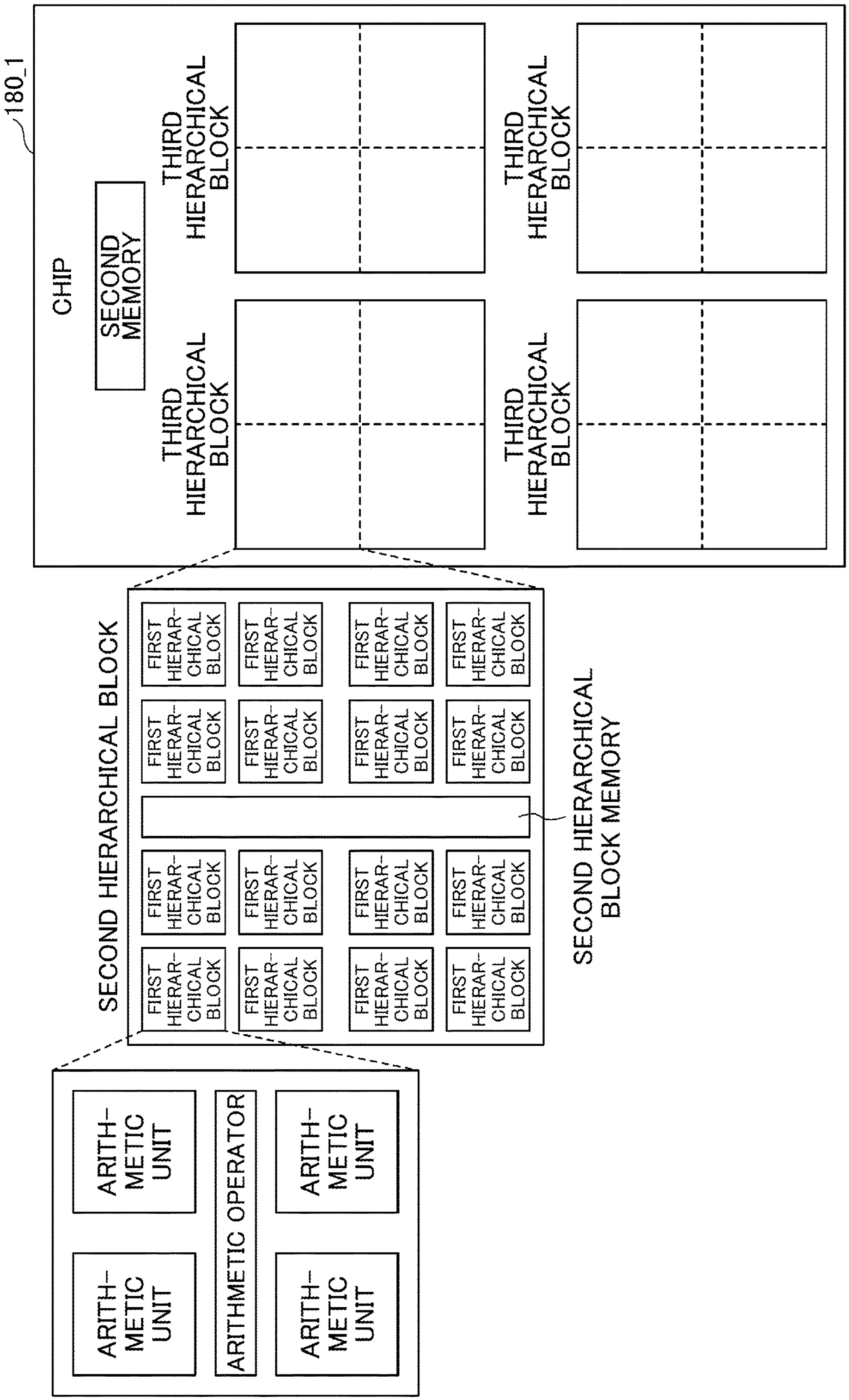
FIG. 2 is a diagram illustrating an example of a hardware configuration of an accelerator chip.

Next, a hardware configuration of the accelerator chip (for example, the chips 180_1 to **180_*n*) mounted on the boards 170_1 to 170_4 according to the present embodiment will be described. FIG. 2** is a diagram illustrating an example of the hardware configuration of the accelerator chip.

The chip 180_1 of the present embodiment (all chips 180_1 to **180_*n* may have the same hardware configuration, and will be described herein for the chip 180_1) operates, for example, by a SIMD architecture without conditional branching. The SIMD is an abbreviation for Single Instruction/Multiple Data, and refers to a method of applying a single instruction to a plurality of data simultaneously and processing them in parallel. However, the chip 180_1** may operate with an architecture other than the SIMD architecture.

As illustrated in FIG. 2, the chip 180_1 may include a Dynamic Random Access Memory (DRAM) as an example of a second memory. The second memory, which will be described later, may have a larger capacity than the first memory but the time required for data transfer is long. In the present disclosure, the time required for data transfer is sometimes referred to as a data transfer cost. The chip 180_1 also has, for example, two third layer blocks. Each third hierarchical block may include two second hierarchical blocks. Each second hierarchical block may include a plurality of first hierarchical blocks and one second hierarchical block memory.

Each first hierarchical block may include one arithmetic operator and four arithmetic units. Each of the four arithmetic units may include Static Random Access Memory (SRAM), which is an example of the first memory, and data may be read from and written to directly from the calculation unit.

The first memory of each arithmetic unit can be accessed faster than the second memory, while the capacity is limited. For this reason, for example, data that is not used immediately by the arithmetic operator and that is required for subsequent computations is saved into the second memory having large capacity.

<Tree Structure Topology>

Figure 3:
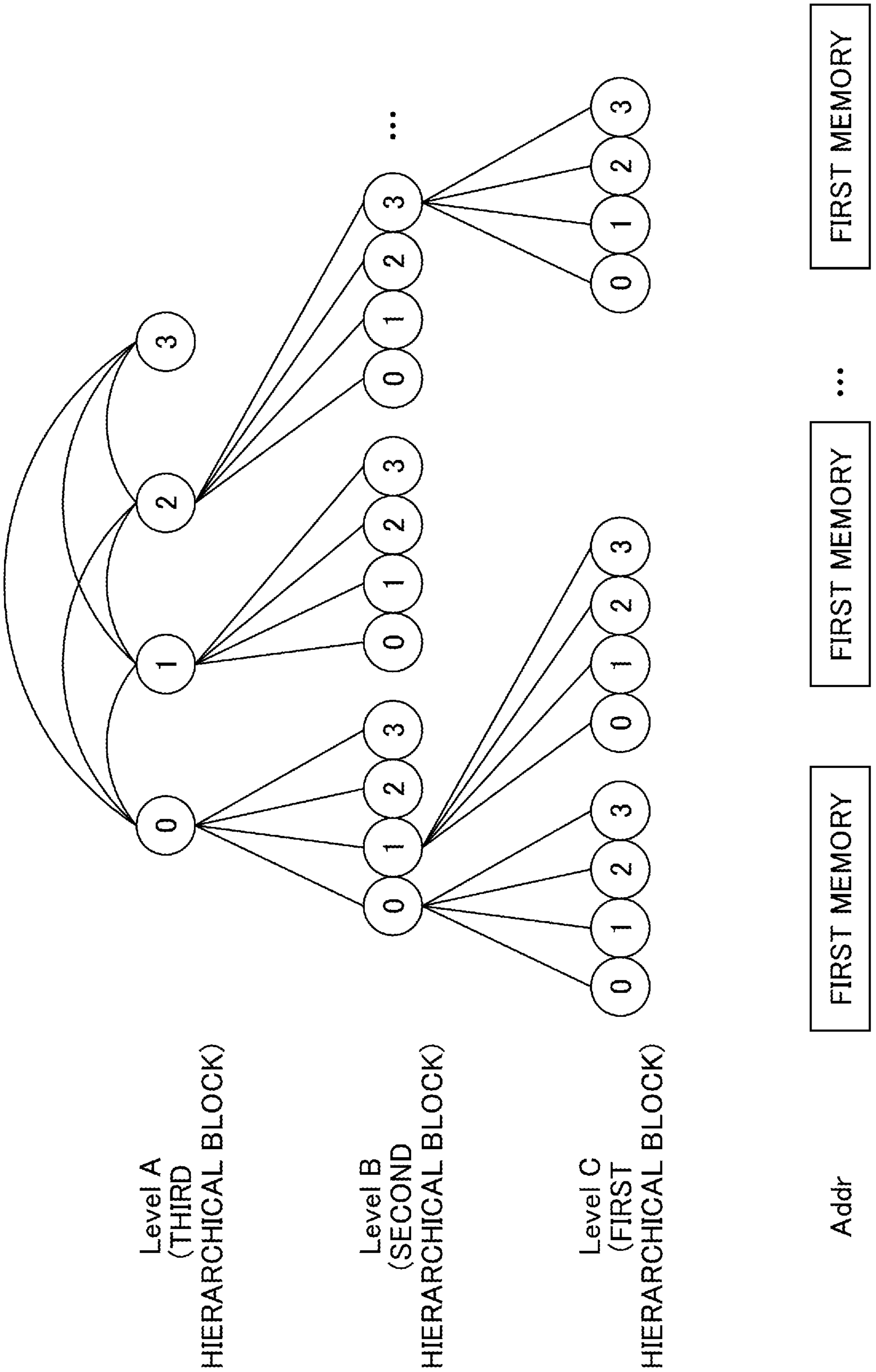
FIG. 3 is a diagram illustrating an exemplary embodiment of a plurality of first memories connected by a tree structure topology and arranged in a distributed manner.

Next, an example of a plurality of first memories arranged in a distributed manner will be described. FIG. 3 is a diagram illustrating an example of a plurality of first memories connected by a tree structure topology and arranged in a distributed manner.

As illustrated in the example of FIG. 3, the four third hierarchical blocks belong to a hierarchy Level A of the tree structure and are connected to each other. Further, each of the four second hierarchical blocks included in each third hierarchical block may belong to a hierarchy Level B of the tree structure and is connected to the corresponding third hierarchical block of the hierarchy Level A of the tree structure.

Further, each of the first hierarchical blocks included in each of the second hierarchical blocks belonging to the hierarchy Level B of the tree structure may belong to a hierarchy Level C of the tree structure, and each may be connected to the corresponding second hierarchical block of the hierarchy Level B of the tree structure.

As described above, the first hierarchical block of Level C may include four arithmetic units, each including a first memory. Then, with respect to the plurality of first memories connected by the tree structure topology and arranged in a distributed manner, a corresponding arithmetic operator immediately may write data used for a computation.

In the present embodiment, the SRAM may be used for the first memory and the DRAM may be used for the second memory. However, other memories may be used if the data transfer cost of the second memory is higher than that of the first memory. For example, the first memory may be another type of memory if the step of reading and writing data by the arithmetic operator is less than the data transfer from the second memory. For example, the first memory and the second memory may be the same type of memory in which the steps required for data transfer are different depending on the distance from the arithmetic operator.

<Functional Configuration of Compiler Device>

Figure 4:
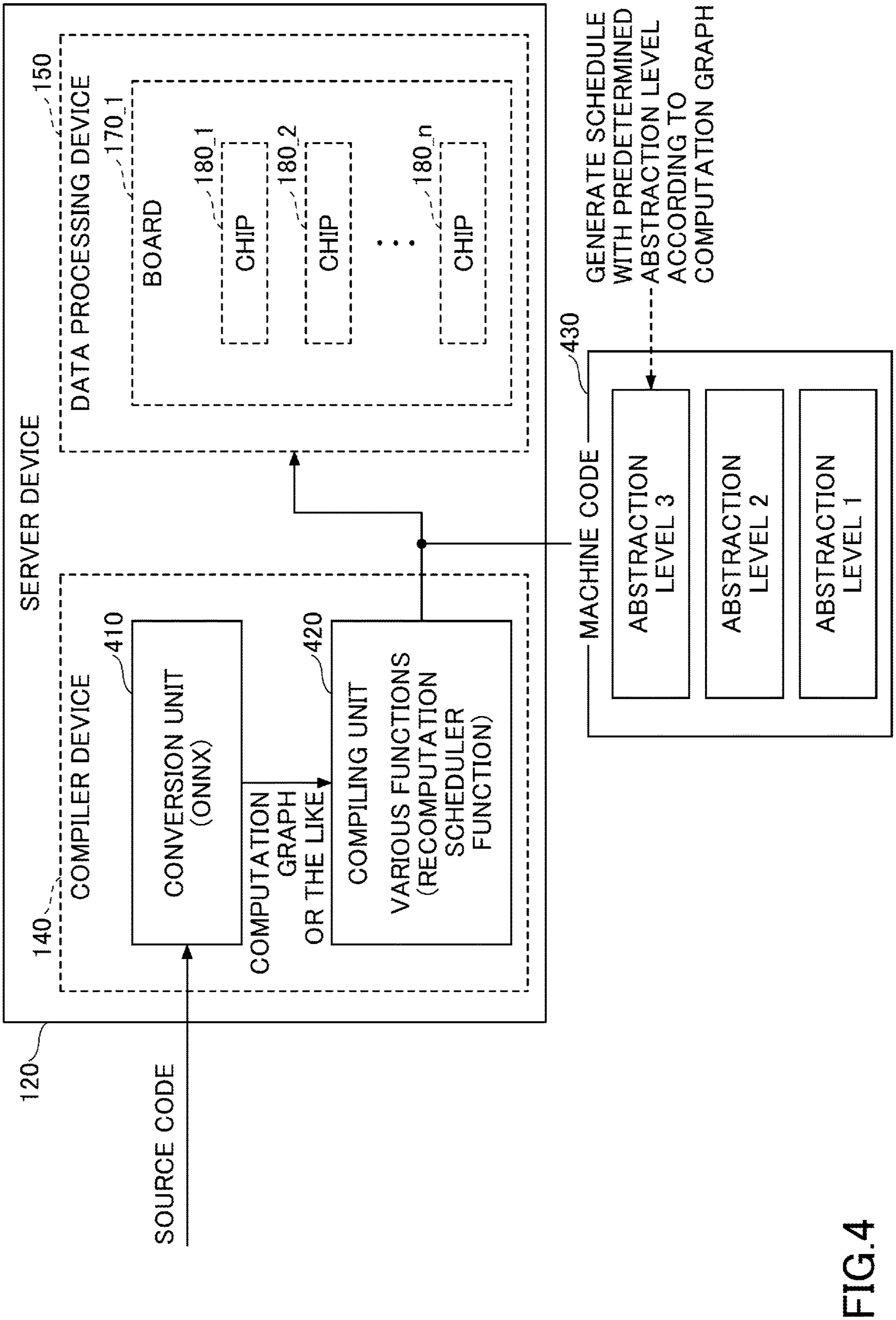
FIG. 4 is a diagram illustrating an example of a functional configuration of a compiler device.

Next, a functional configuration of the compiler device 140 included in the server device 120 according to the present embodiment will be described. FIG. 4 is a diagram illustrating an example of a functional configuration of the compiler device.

In the compiler device 140 according to the present embodiment, a conversion program and a compiler are installed, and when the program is executed, the compiler device 140 may function as a conversion unit 410 and a compiling unit 420.

The conversion unit 410 according to the present embodiment may generate a computation graph or the like based on the source code transmitted from the terminal device 110. The computation graph may be a graphical representation of a flow of computation from an input tensor to an output tensor, or a graphical representation of a flow of computation that updates the tensor value. For example, if the source code is written in Python (registered trademark) code, the conversion unit 410 executes the source code and generates the computation graph by converting the source code into an ONNX format. Note that ONNX is an abbreviation for Open Neural Network Exchange.

The conversion unit 410 may notify the compiling unit 420 of the generated computation graph or the like.

The compiling unit 420 may perform a compiling process by inputting the computation graph or the like notified by the conversion unit 410 and generates machine code 430. The compiling unit 420 may transmit the generated machine code 430 to the data processing device 150.

The compiling unit 420 may have various functions that are executed for performing the compiling process. In the present embodiment, a recomputation scheduler function (a function that determines a computation order and a recomputation point according to the computation graph and generates an appropriate schedule) will be described in detail. That is, the compiler device 140 will be described below as referring to a scheduling apparatus.

When the recomputation scheduler function is executed in the compiling process by the compiling unit 420, a "schedule" for the computation may be generated according to the computation graph. The recomputation scheduler function that generates a "schedule" for the computation may include determining the computation order and determining the recomputation point.

Further, the recomputation scheduler function that generates a "schedule" for the computation may include setting the process of transferring the data in addition to determining the computation order and the recomputation point. This allows the step number simulator described below to calculate or estimate the number of steps required to perform the transfer process. The setting of the transfer process may be performed by a function other than determining the computation order and the recomputation point. For example, the other function may receive a computation schedule from a function that performs determining the computation order or recomputation point, set the transfer process according to the computation schedule, and transmit the schedule to which the transfer process is added to the step number simulator.

As illustrated in FIG. 4, the machine code 430 generated when the compiling unit 420 performs the compiling process according to the present embodiment may be composed of multiple abstraction levels (three abstraction levels in the example of FIG. 4), hereinafter referred to as Abstraction Level 3 to Abstraction Level 1. In the recomputation scheduler function, a "schedule" for the computation at Abstraction Level 3 (an abstraction in which computation scheme with regard to operators such as convolution and batch normalization is decided) may be generated according to the computation graph.

<Example of Recomputation Scheduler Function Processing>

Figure 5:
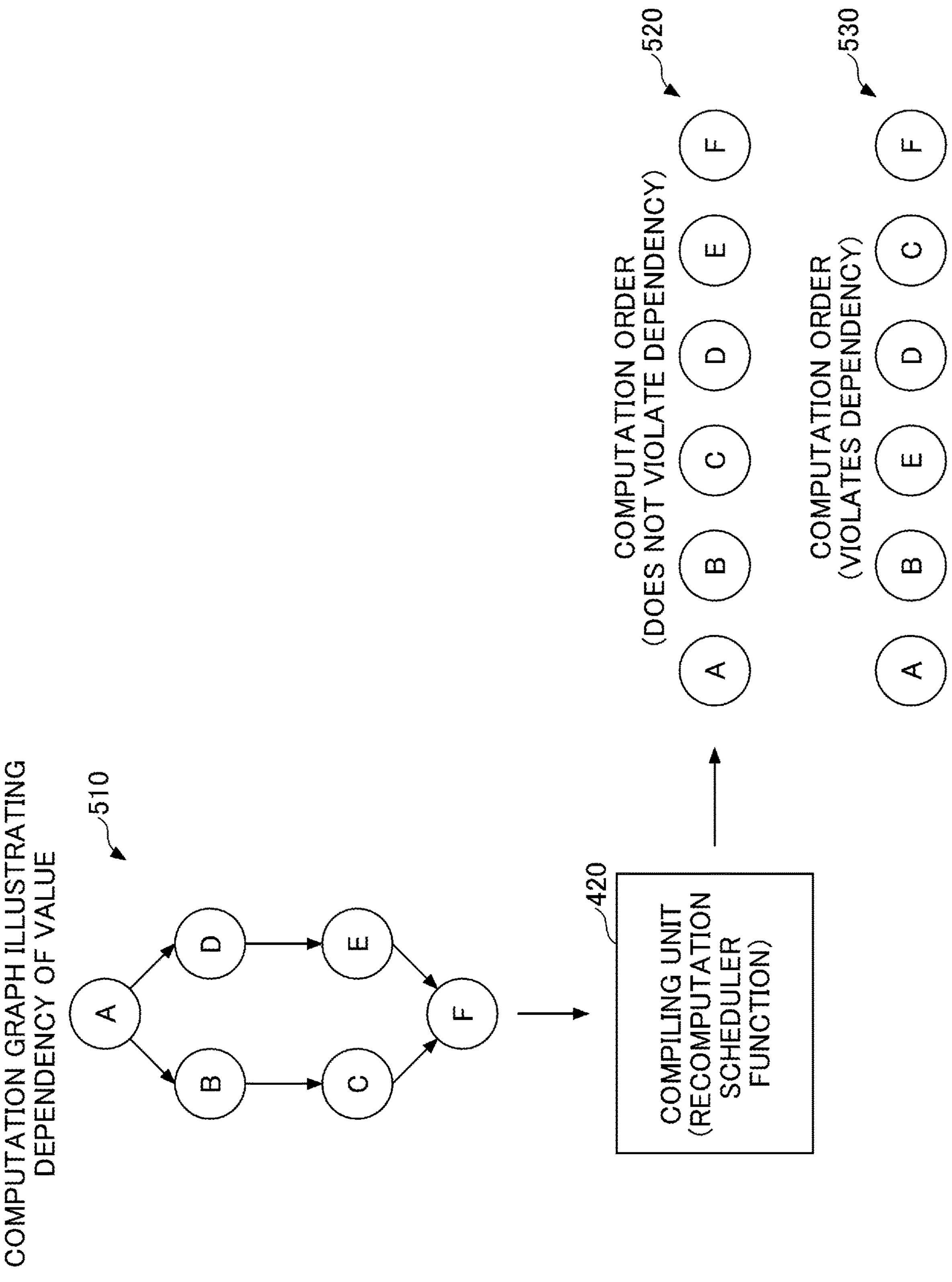
FIG. 5 is a diagram illustrating an example of a computation order determination process.

Next, a specific example of a computation order determination process performed by the recomputation scheduler function of the compiling unit 420 according to the present embodiment will be described. FIG. 5 is a diagram illustrating one embodiment of a computation order determination process.

As described above, the recomputation scheduler function of the compiling unit 420 may determine the computation order according to the computation graph in generating a schedule. In FIG. 5, a reference numeral 510 represents a computation graph indicating a dependency of values. In the recomputation scheduler function of the compiling unit 420, the computation order may be determined according to the computation graph.

The computation graph indicated by the reference numeral 510 illustrates that: the value "A" is computed first; the value "B" is computed based on the value "A" and the value "C" is computed based on the value "B"; the value "D" is computed based on the value "A", the value "E" is computed based on the value "D"; and the value "F" is computed based on the value "C" and the value "F".

Here, if it is attempted to determine the computation order without violating the dependency of the values illustrated in the above computation graph, for example, the computation order becomes as illustrated in a reference numeral 520. Accordingly, the recomputation scheduler function can determine, for example, a computation order as illustrated by the reference numeral 520.

Conversely, a reference numeral 530 illustrates, as a comparative example, a computation order violating the dependency of the values illustrated in the above computation graph. Specifically, since the computation of the value "E" is positioned before the computation of the value "D", the computation of the value "E" cannot be performed based on the computation of the value "D". Therefore, the computation order violates the dependency of the values illustrated in the above computation graph. In the recomputation scheduler function, the schedule is determined by avoiding the computation order violating the dependency of the values illustrated in the computation graph.

Next, a specific example of a computation order and a recomputation point determination process performed when the recomputation scheduler function of the compiling unit 420 generates a schedule will be described.

Figure 6:
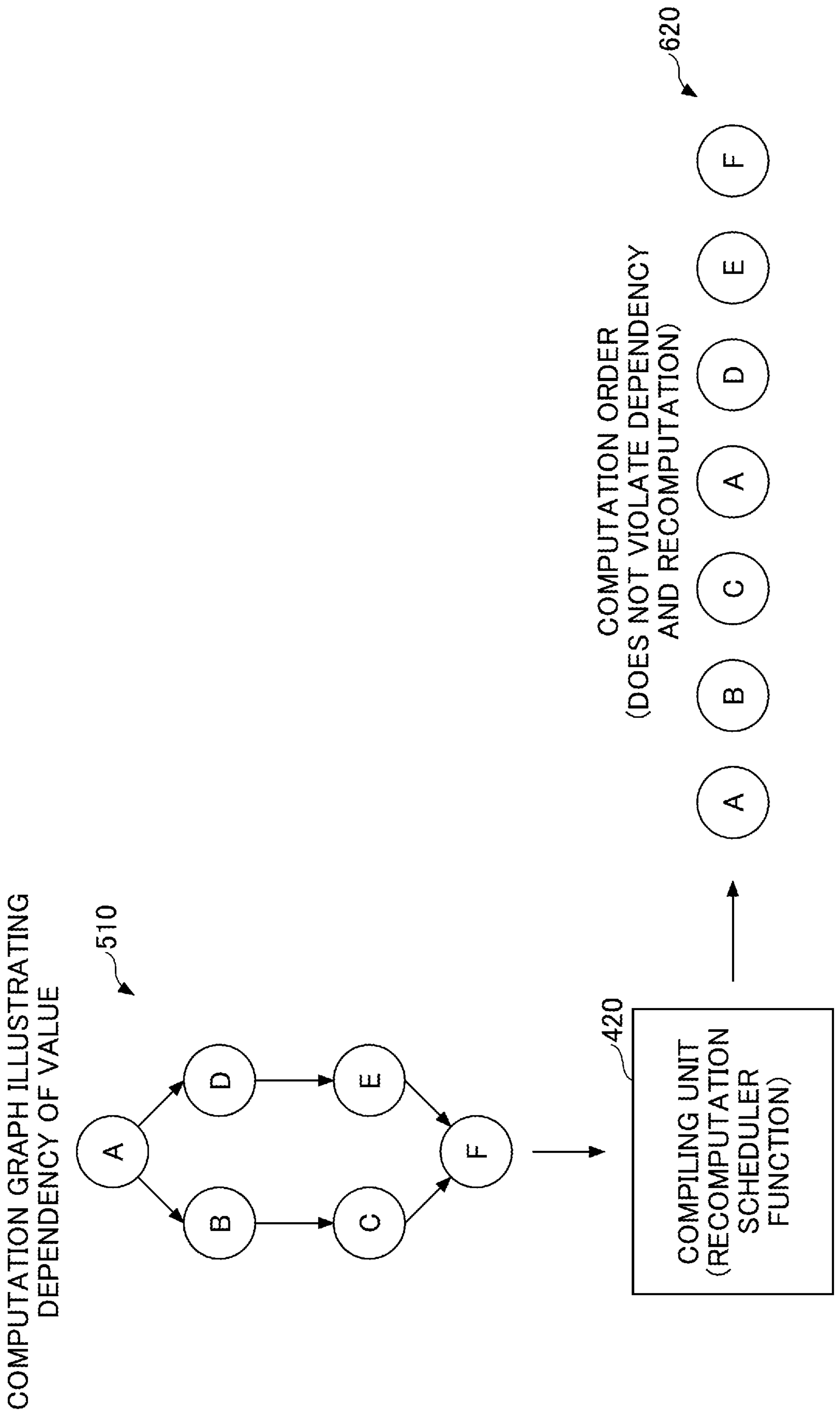
FIG. 6 is a diagram illustrating an example of a computation order and recomputation point determination process.

FIG. 6 is a diagram illustrating an example of a computation order and a recomputation point determination process. As described above, the recomputation scheduler function of the compiling unit 420 may determine the recomputation point in addition to the computation order. In FIG. 6, the reference numeral 510 is a computation graph indicating a dependency of values, and the recomputation scheduler function of the compiling unit 420 may determine the computation order and the recomputation point according to the computation graph.

In FIG. 6, a reference numeral 620 illustrates that the computation order is determined by the recomputation scheduler function and that it is determined to perform recomputing with respect to the value "A" before computing the value "D."

According to the computation graph indicated by the reference numeral 510, the value "D" is computed based on the value "A". Therefore, the computed value "A" when the value "B" is computed may be stored in the memory and may be read from the memory when the value "D" is to be computed (i.e., the reference numeral 520 of FIG. 5 assumes such processing).

Alternatively, as indicated by the reference numeral 620, the value "A" may be computed again (i.e., recomputed) instead of reading the value "A" from the memory when computing the value "D".

As described above, the schedule determined by the recomputation scheduler function that performs a recomputation instead of reading the value "A" from the memory is determined to be preferable. This is because, for example, when the value "A" is stored in the second memory, the number of steps for reading may be increased and the execution time may be increased.

Figure 7A:
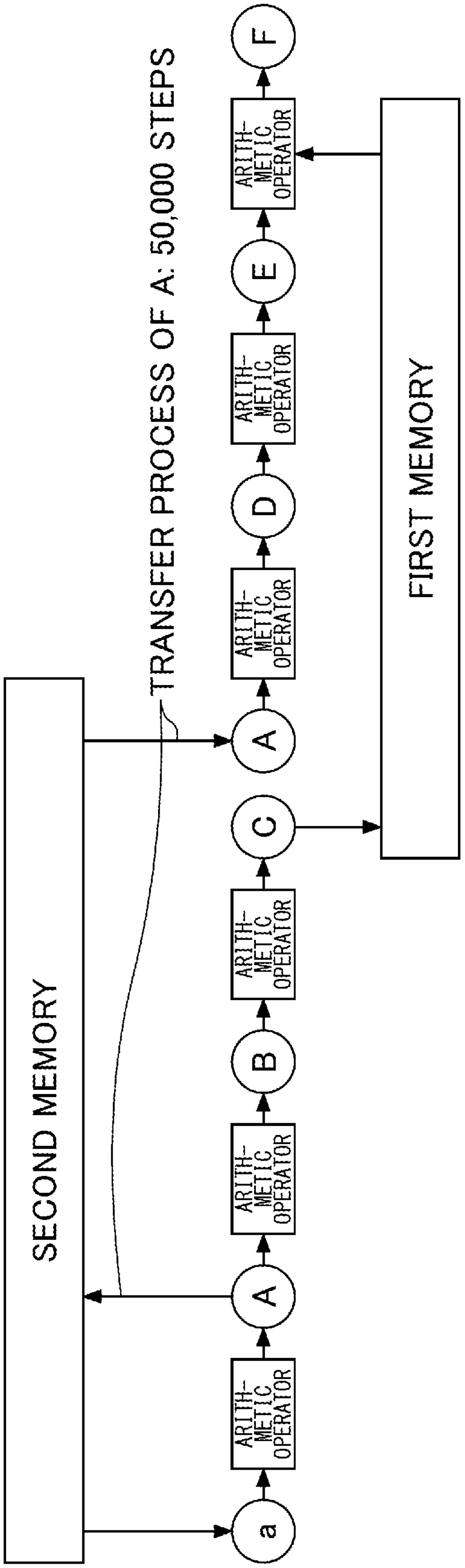
FIG. 7A is a diagram illustrating an example of the calculation of the number of steps of a transfer process and the number of steps of a recomputation process.
Figure 7B:
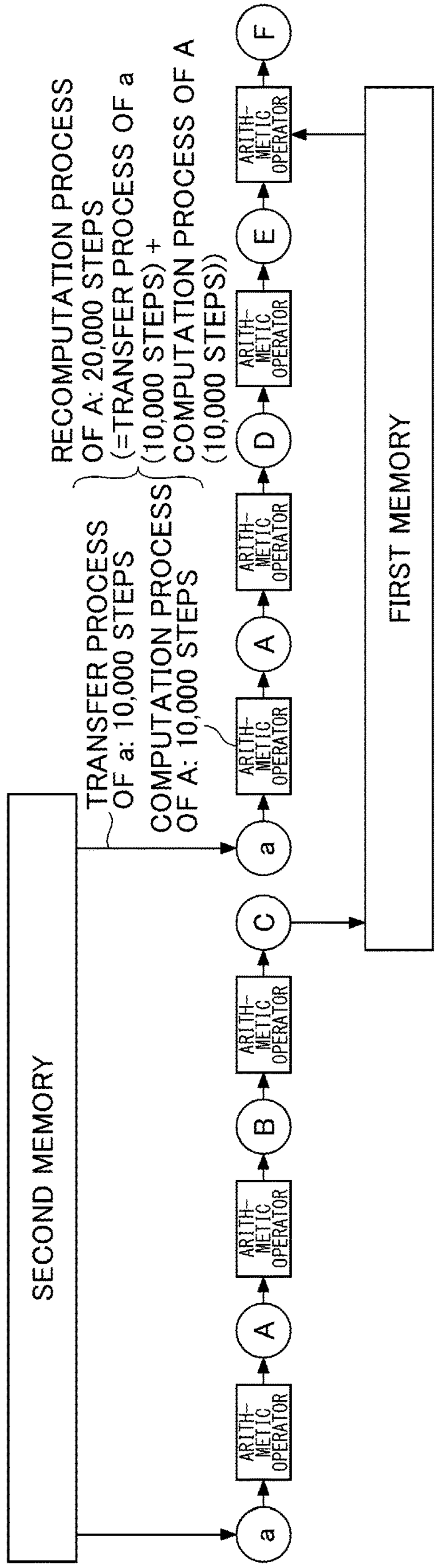
FIG. 7B is a diagram illustrating an example of the calculation of the number of steps of the transfer Process and the number of steps of the recomputation process.

Here, the number of steps in the case where recomputation is not performed and the number of steps in the case where recomputation is performed will be described with reference to FIG. 7A and FIG. 7B. FIG. 7A and FIG. 7B are diagrams illustrating an example of a calculation of the number of steps of a transfer process and the number of steps of a recomputation process.

An example of FIG. 7A is a diagram illustrating the number of steps in which recomputation is not performed. Specifically, in the example of FIG. 7A, the value "A" is used for the computation of the value "B" after the value "A" is computed based on the value "a" read from the second memory, while the value "A" is saved to the second memory.

In the example of FIG. 7A, the value "C" is computed based on the value "B" and the value "C" is written to the first memory, and then the value "A" (a computation result based on the value "a") is read out from the second memory in order to compute the value "D." Further, in the example of FIG. 7A, the value "D" is computed based on the read-out value "A", the value "E" is computed based on the value "D", and the value "F" is computed based on the value "E" and the value "C" written in the first memory.

On the other hand, an example of FIG. 7B is a diagram illustrating the number of steps in which recomputation is performed. Specifically, in the example of FIG. 7B, the value "A" is used for the computation of the value "B" after the value "A" is computed based on the value "a" read from the second memory.

In the example of FIG. 7B, the value "C" is computed based on the value "B" and the value "C" is written to the first memory, and then the value "a" is read out from the second memory and the value "A" is computed in order to compute the value "D." Further, in the example of FIG. 7B, the value "D" is computed based on the computed value "A", the value "E" is computed based on the value "D", and the value "F" is computed based on the value "E" and the value "C" written in the first memory.

Here, comparing FIG. 7A and FIG. 7B, in the case of FIG. 7A, in computing the value "D", it takes 50,000 steps to perform a transfer process for saving the value "A" to the second memory and a transfer process for reading the value "A" from the second memory. On the other hand, in the case of FIG. 7B, in computing the value "D", instead of saving the value "A" into the second memory and reading the value "A" from the second memory, the value "a" is read out and the value "A" is recomputed based on the value "a".

At this time, it takes 10,000 steps to perform the transfer process when reading the value "a" from the second memory, and 10,000 steps to perform the computation process for the value "A" from the value "a". However, as illustrated in FIG. 7B, the value "A" is not required to be saved to the second memory only when all readings of the value "A" are cleared. When the value "A" is read from the second memory and used in another computation, it is necessary to perform the transfer process for saving the value "A" to the second memory.

As described above, in the case of FIG. 7A, it takes 50,000 steps to perform the transfer process of the value "A" to the second memory and the transfer process of the value "A" from the second memory. In the case of FIG. 7B, when it is not necessary to perform the transfer process of the value "A" to the second memory, the recomputation process of the value "A" (the transfer process of the value "a" plus the computation process of the value "A") requires 20,000 steps.

That is, when the number of steps required to access the second memory is large, acquiring the value required for computation by recomputation may result in fewer steps and a shorter execution time than acquiring the value saved in the second memory by reading it from the second memory.

The recomputation scheduler function of the compiling unit 420 according to the present embodiment may calculate or estimate the number of steps required to execute the transfer process when saving to the second memory and reading out from the second memory in consideration of a configuration that takes a long time to access the second memory, such as chip 180_1. Further, the number of steps required for the recomputation process may be calculated or estimated.

The recomputation scheduler function of the compiling unit 420 according to the present embodiment may generate a schedule by replacing the transfer process from the second memory with a recomputation process based on the calculation result or the estimation result of the number of steps. Accordingly, according to the recomputation scheduler function of the compiling unit 420 according to the present embodiment, a schedule can be generated according to the configuration of the chip 180_1 in which the machine code is executed, and the execution time can be shortened.

<Functional Configuration of Recomputation Scheduler Function>

Figure 8:
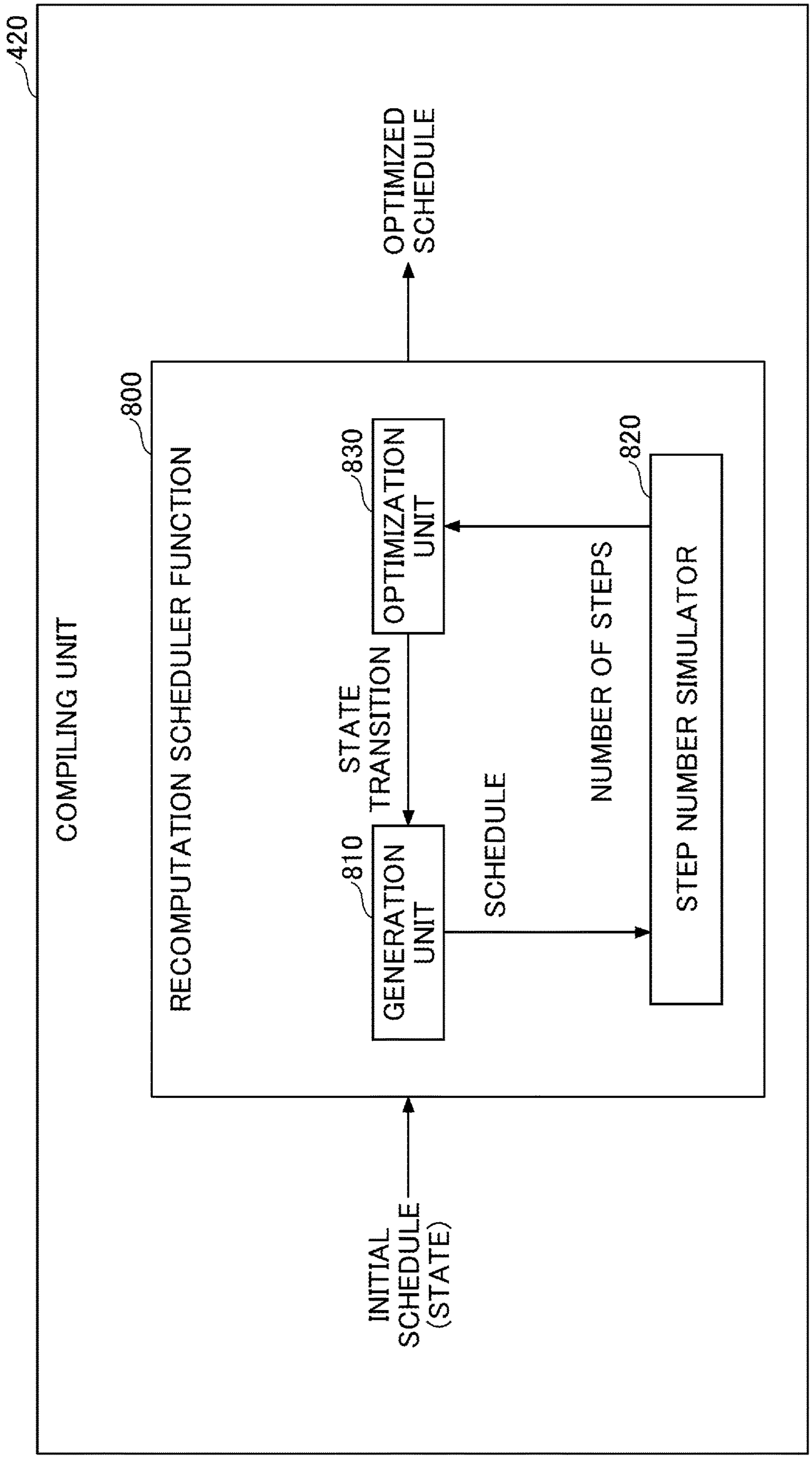
FIG. 8 is a first diagram illustrating details of a functional configuration of a recomputation scheduler function.

Next, a functional configuration of the recomputation scheduler function of the compiling unit 420 will be described in detail. FIG. 8 is a first diagram illustrating details of the functional configuration of the recomputation scheduler function. As illustrated in FIG. 8, a recomputation scheduler function 800 may include a generation unit 810, a step number simulator 820, and an optimization unit 830.

According to the present embodiment, the generation unit 810 may specify a "state" which is a source of an initial schedule based on the computation graph and sets the transfer process or the like when the "neighbor state" that is the next transition destination candidate is selected. Accordingly, the generation unit 810 may generate a schedule. The "state" is at least information indicating the computation order. In the present embodiment, information indicating the computation order and the recomputation point may be specified based on the computation graph. The computation graph is an example of the information received by the generation unit 810.

The step number simulator 820 may calculate or estimate the number of steps (the total number of steps) for the schedule generated by the generation unit 810. The step number simulator 820 may notify the optimization unit 830 of the calculated or estimated step number.

The optimization unit 830 may optimize the number of steps notified from the step number simulator 820 as a state score, for example, using an "simulated annealing method." The "simulated annealing method" is one of the metaheuristics for the optimization problem, in which the transition to the "neighbor state" is repeated and optimized. The transition to the "neighbor state" may proceed in principle toward improving the state score, but the annealing method may allow the state to be changed in the direction of worsening the state score.

The transition to the "neighbor state" includes, for example, changing the position of one computation, recomputing a value on which one computation is directly dependent immediately before the computation, removing the recomputation, or the like. In either case, it is necessary to make the transition in a way that does not violate the dependency or to reject the violation of the dependency.

The optimization method by the optimization unit 830 is not limited to the "simulated annealing method." For example, other metaheuristic techniques may be used to optimize, such as the Hill climbing method, the Metropolis method, or the like. However, in the present embodiment, a schedule with a smaller number of steps may be optimized using the "simulated annealing method" that is considered to be easier to obtain.

The state after the transition transitioned by the optimization unit 830 may be specified by the generation unit 810. The optimization unit 830 repeatedly may perform the transition of state by the simulated annealing method until the state score is optimized, and may output the generated schedule when the state score is optimized as an optimized schedule. The term "optimization" here refers to "improvement" and is not necessarily limited to obtaining a global optimal solution.

Note that the transition of state using the simulated annealing method may include a transition of state so that the acquisition of the value by the transfer from the second memory can easily be replaced with the recomputation process.

Specifically, when the number of steps required to execute the transfer process from the second memory is greater than the number of steps required to execute the recomputation process, the transition of state may be performed so that the transfer process from the second memory is replaced with the recomputation process.

It should be noted that the state transition to replace the transfer process from the second memory with the recomputation process does not necessarily have to be executed when the number of steps required to execute the transfer process from the second memory is greater than the number of steps required to execute the recomputation process. Further, when the simulated annealing method is used, the state may not necessarily be transitioned so as to reduce the number of steps, or the state may be transitioned so as to increase the number of steps at the time of searching for the optimal state.

<Specific Example of Process by Recomputation Scheduler Function>

Next, a specific example of a process by the recomputation scheduler function 800 will be described.

(1) Specific Example of Schedule Generation Process by the Generation Unit

First, a specific example of a schedule generation process in which the generation unit 810 may set a transfer process or the like to generate a schedule will be described by specifying a "state" that is the source of the initial schedule based on the computation graph.

Figure 9:
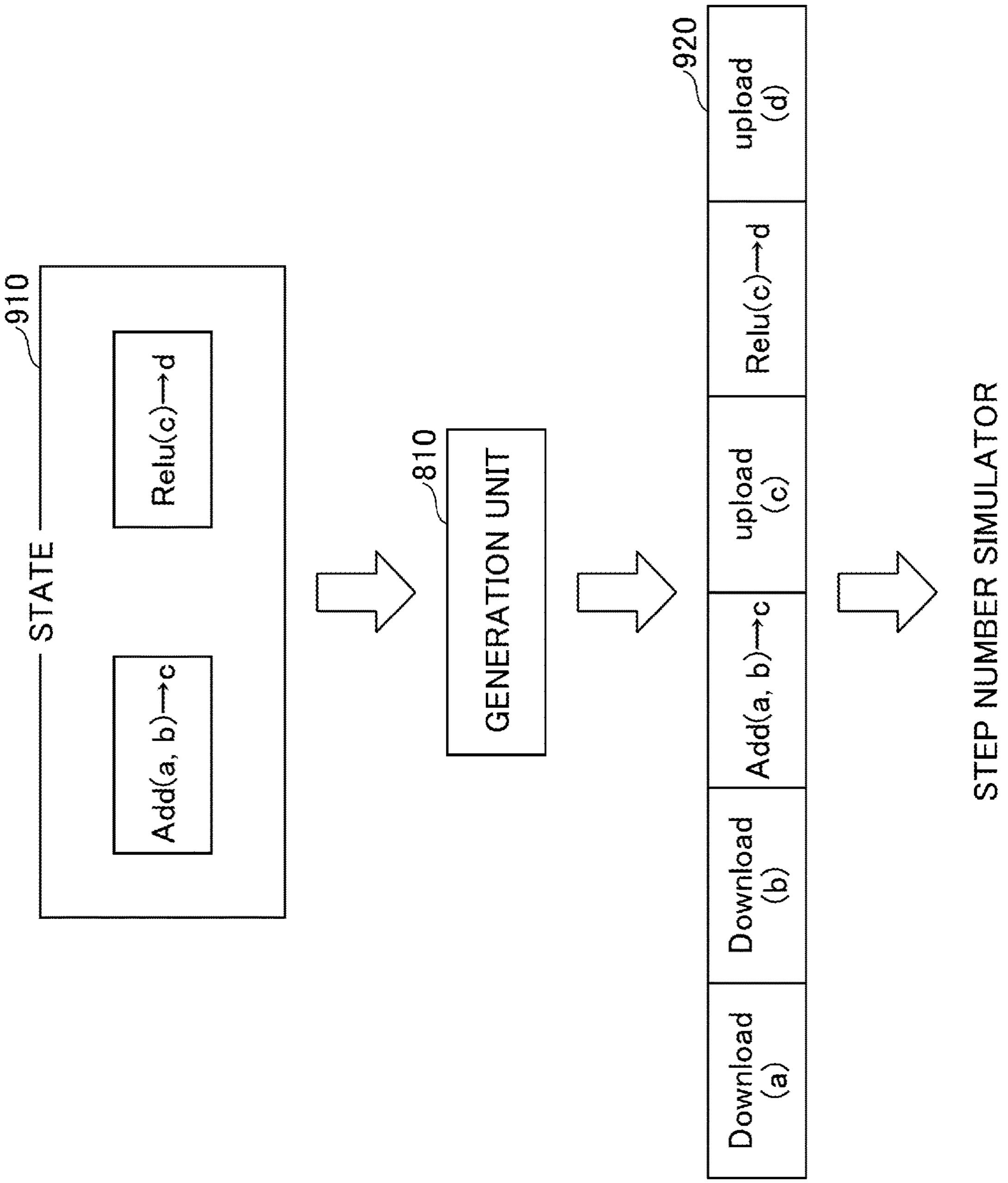
FIG. 9 is a first diagram illustrating a specific example of a schedule generation process by a generation unit.

FIG. 9 is a first diagram illustrating a specific example of the schedule generation process by the generation unit. The example of FIG. 9 illustrates that the generation unit 810 specifies the computation order as a state 910 based on the computation graph, may set the transfer process based on the specified state 910 to generate a schedule 920, and may notify the generated schedule 920 to the step number simulator.

Specifically, as the state 910, the generation unit 810 may specify that, first, the value "a" is summed with the value "b" to output the value "c", and then the value "c" is input into the Relu function to output the value "d."

Further, as the transfer process, the following settings may be made to generate the schedule 920.

- The transfer process in which the value "a" and "b" are downloaded from the second memory is set before performing the computation that sums the value "a" and the value "b" to output the value "c".
- After performing the computation that sums the value "a" and the value "b" to output the value "c", the transfer process of uploading the value "c" to the second memory is set.
- After performing the computation that inputs the value "c" into the Relu function to output the value "d", the transfer process of uploading the value "d" to the second memory is set.

(2) Specific Example of State Transition Process by Optimization Unit

Figure 10A:
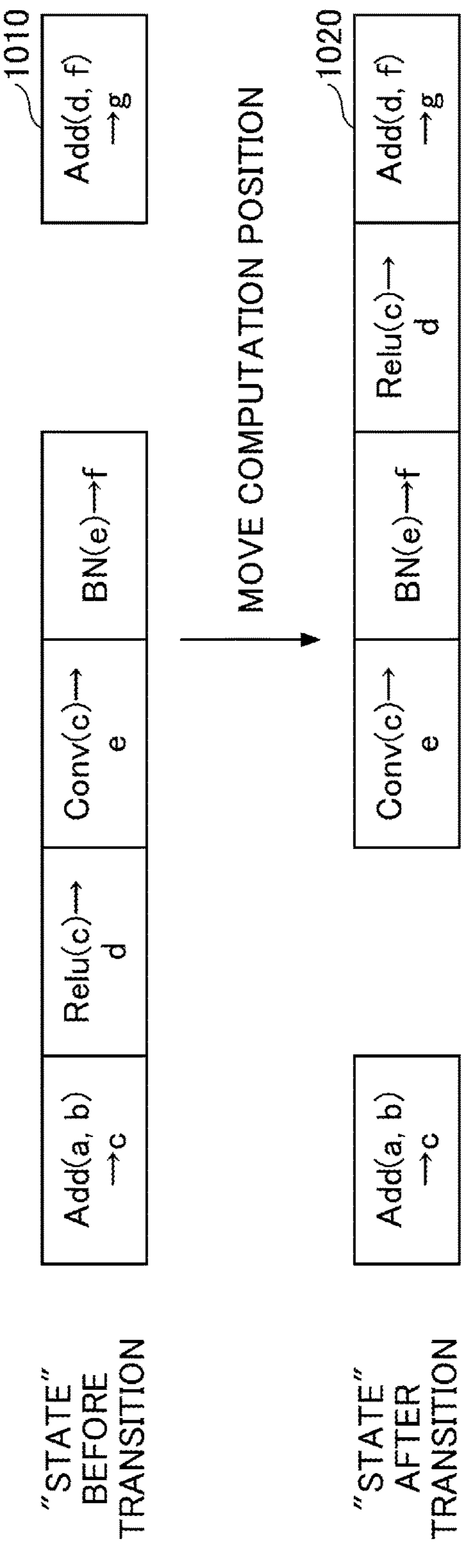
FIG. 10A is a diagram illustrating a specific example of a state transition process by an optimization unit.
Figure 10B:
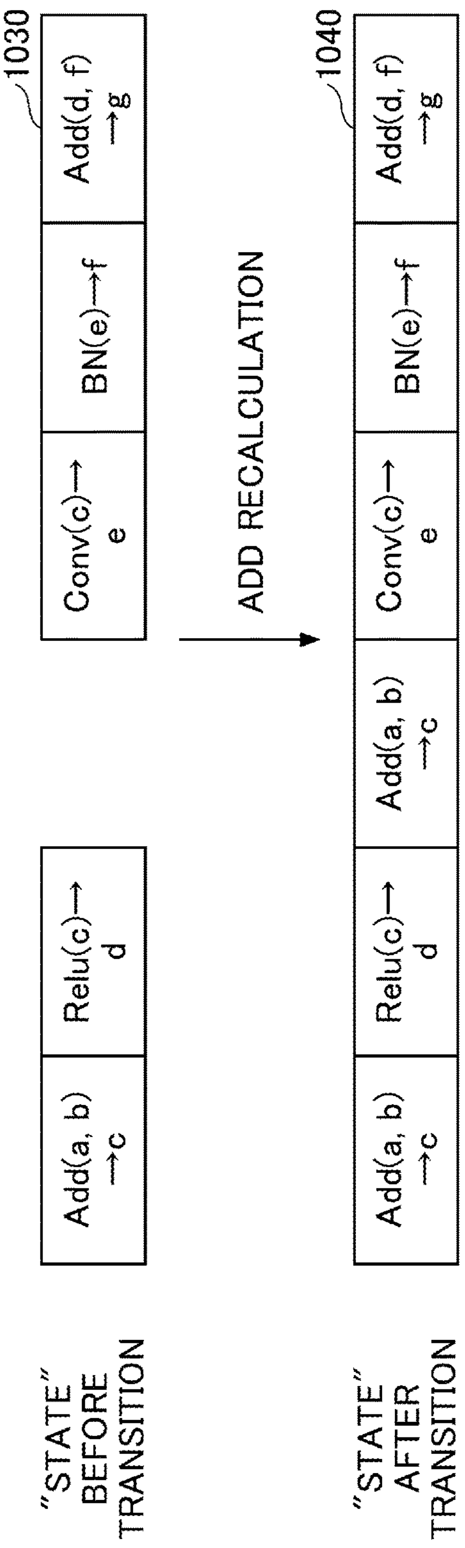
FIG. 10B is a diagram illustrating a specific example of the state transition process by the optimization unit.

Next, a specific example of a state transition process in which the optimization unit 830 transitions the state will be described in the recomputation scheduler function 800. FIG. 10A and FIG. 10B are diagrams illustrating a specific example of the state transition process by the optimization unit.

In the example illustrated in FIG. 10A, first, a state 1010 (information indicating the computation order) before transition may be specified by the generation unit 810, subsequently, with respect to the specified next destination candidate, the optimization unit 830 may determine whether the state is to be transitioned to the specified next transition candidate based on the number of steps calculated or estimated by the step number simulator 820, and then the state is transitioned to a new state 1020 (information indicating the new computation order).

In the example of FIG. 10A, the "state" is transitioned and the computation in which the value "c" is input into the Relu function to output the value "d" moves from after the computation that outputs the value "c" to before the computation that outputs the value "g".

Similarly, in the example illustrated in FIG. 10B, first, a state 1030 (information indicating the computation order) before the transition is specified by the generation unit 810, subsequently, when the optimization unit 830 generates a plurality of next transition candidates as a state next to the specified state 1030, one next transition candidate is selected by the generation unit 810. Subsequently, the optimization unit 830 may determine whether the state is to be transitioned to the selected next transition candidate based on the number of steps calculated or estimated by the step number simulator 820, and then the state may be transitioned to a new state 1040 (information indicating the new computation order and recomputation point).

In the example of FIG. 10B, the "state" is transitioned and the recomputation process that outputs the value "c" by adding the value "a" and the value "b" is added before the computation in which the value "c" is input into the convolution function to output the value "e".

<Flow of Schedule Optimization Process>

Figure 11:
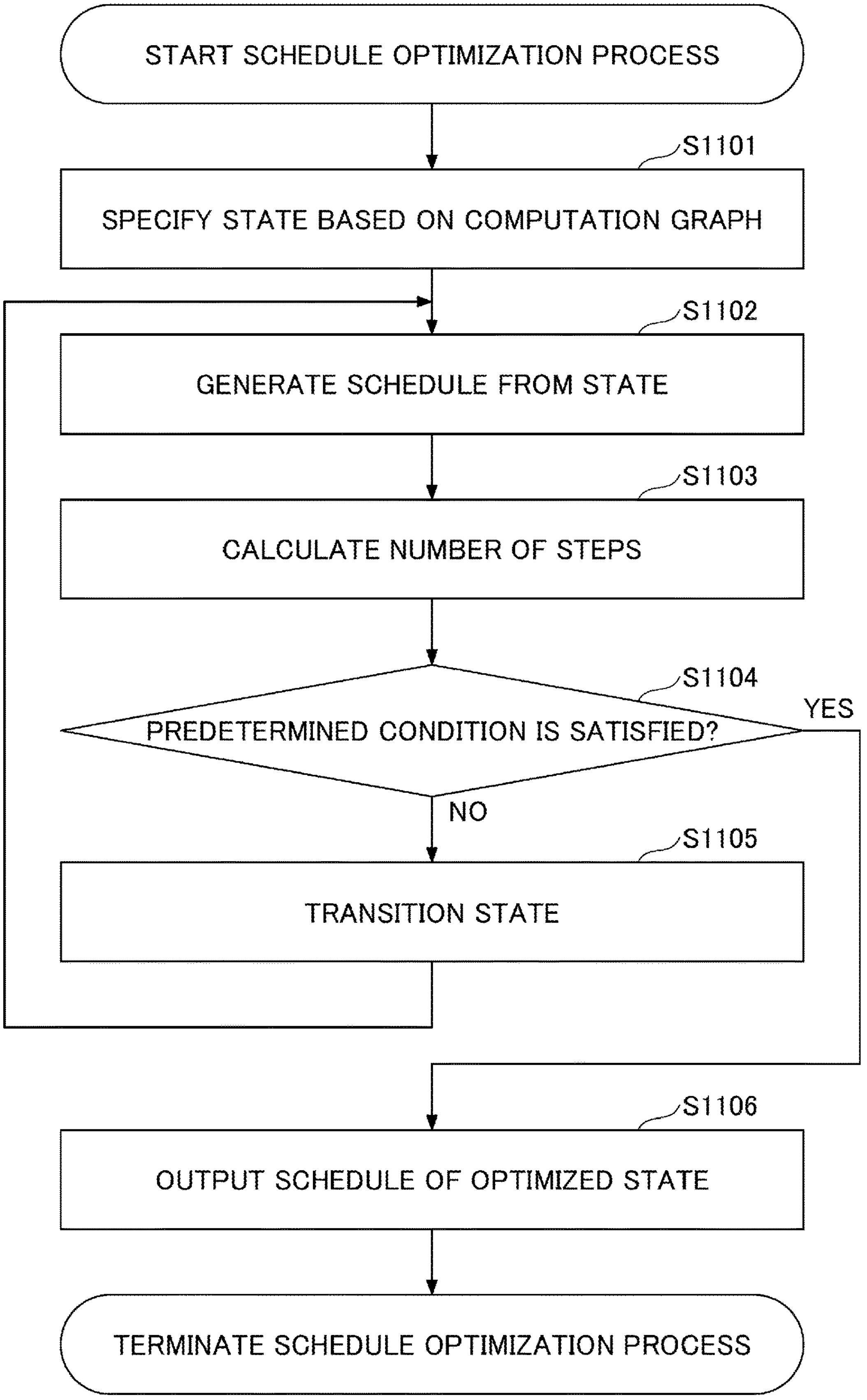
FIG. 11 is a flowchart illustrating a flow of a schedule optimization process.

Next, a flow of the schedule optimization process by the recomputation scheduler function 800 will be described. FIG. 11 is a flowchart illustrating a flow of the schedule optimization process.

In step S1101, the recomputation scheduler function 800 may specify a state based on the computation graph which is information received from an external source.

In step S1102, the recomputation scheduler function 800 may generate a schedule from the specified state.

In step S1103, the recomputation scheduler function 800 may calculate or estimate the number of steps based on the generated schedule, and store the generated schedule in association with the number of steps calculated or estimated.

In step S1104, the recomputation scheduler function 800 may determine whether the predetermined condition is satisfied, and if it is determined that the predetermined condition is not satisfied (in the case of NO in step S1104), proceeds to step S1105.

The predetermined condition refers, for example, to a case where the number of steps calculated or estimated is less than a predetermined number of steps, a case where the efficiency of the current optimization is compared with the estimated time required for learning and it is determined that the continuing of further optimization would be a loss if further optimization was continued, or a case where repeating the simulated annealing method is performed more than a predetermined number of times.

In step S1105, the recomputation scheduler function 800 may use the simulated annealing method to transition the state so that a schedule with a minimum number of steps is generated.

Conversely, in Step S1104, when it is determined that the predetermined condition is satisfied (in the case of YES in Step S1104), the process proceeds to Step S1106.

In step S1106, the recomputation scheduler function 800 may select the schedule having the least number of steps among the stored schedules with the predetermined condition satisfied. This may allow the recomputation scheduler function 800 to determine the optimal computation order and recomputation point. The recomputation scheduler function 800 also may output the selected schedule as an optimized schedule of computation order and recomputation point.

SUMMARY

As is clear from the above description, the compiler device 140 according to the first embodiment, may function as a scheduling apparatus that generates a schedule of computations, including the computation order of the computations performed on the chip 180_1 or the like including a first memory and a second memory. The compiler device 140 according to the first embodiment may generate the schedule from the specified state based on the received information and may calculate or estimate the time required to execute the process including the process of transferring the data from the second memory based on the generated schedule.

In the compiler device 140 according to the first embodiment, generating the schedule may include causing the state to transition such that the process of transferring the data from the second memory is replaced with a recomputation process for acquiring the data.

As described above, the compiler device 140 according to the first embodiment may generate a schedule by replacing the transfer process from the second memory with a recomputation process in consideration of the configuration where the access to the second memory takes a long time.

Thus, according to the first embodiment, a schedule can be generated depending on the configuration of the device in which the machine code is executed.

Second Embodiment

In the first embodiment, FIG. 8 has been illustrated as a detailed functional configuration of the recomputation scheduler function, but the functional configuration of the recomputation scheduler function is not limited to FIG. 8. In the second embodiment, a functional configuration of the recomputation scheduler function different from that of FIG. 8 is illustrated.

<Functional Configuration of Recomputation Scheduler Function>

Figure 12:
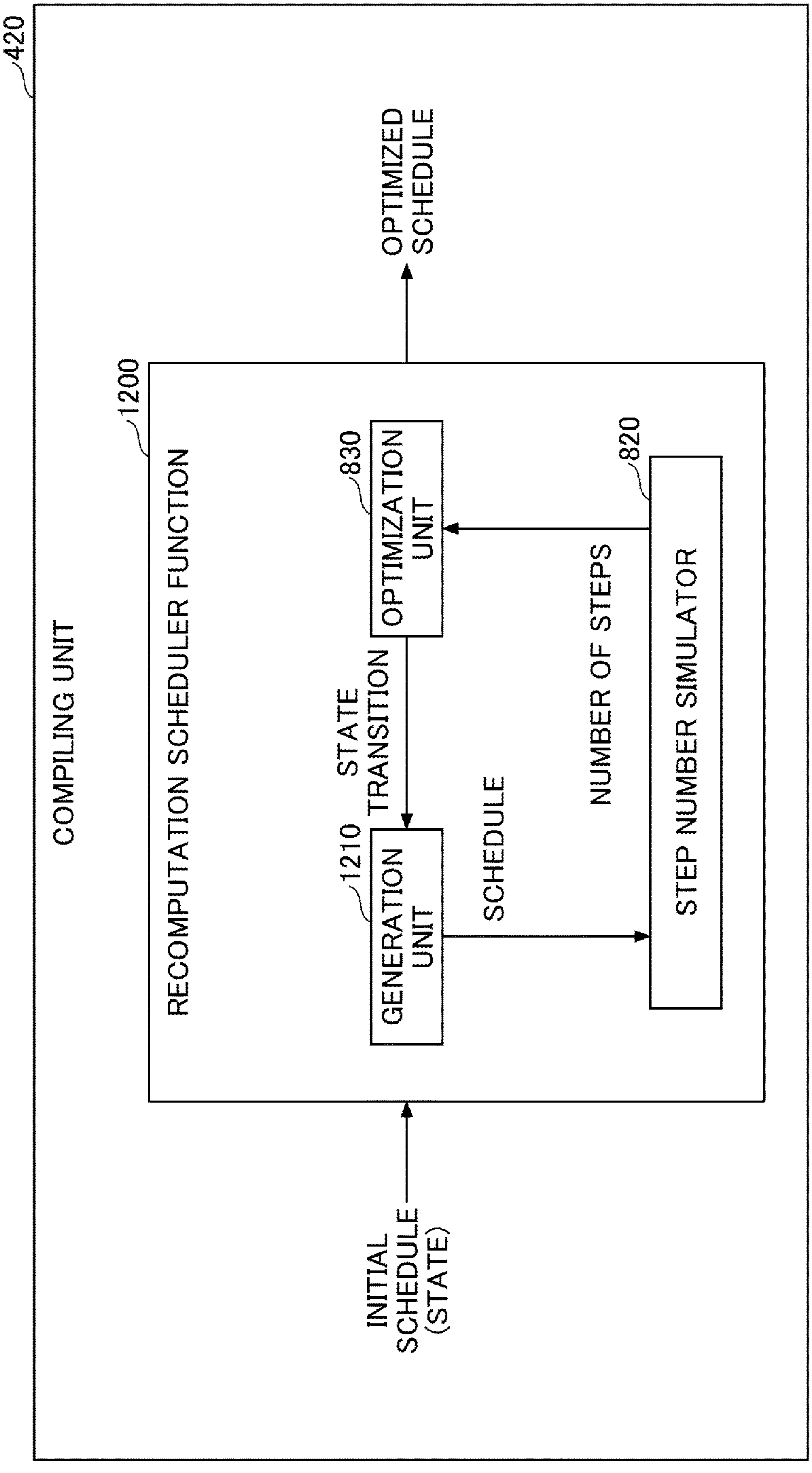
FIG. 12 is a second diagram illustrating details of a functional configuration of the recomputation scheduler function.

FIG. 12 is a second diagram illustrating details of a functional configuration of the recomputation scheduler function. As illustrated in FIG. 12, a recomputation scheduler function 1200 may include a generation unit 1210, a step number simulator 820, and an optimization unit 830.

According to the present embodiment, the generation unit 1210 may specify a "state" which is a source of an initial schedule based on the computation graph and may set a recomputation process or the like when the "neighbor state" that is the next transition destination candidate is selected. Accordingly, the generation unit 1210 may generate a schedule.

In the present embodiment, the "state", set based on the computation graph may include information indicating a value to be recomputed when it does not exist in the first memory, and a sequence that is the source of the computation order. The generation unit 1210 may determine the computation order that does not violate the dependency specified by the computation graph while maintaining the order that is the source of the computation order as much as possible, and may set the recomputation process so that the value is acquired by recomputation when it does not exist in the first memory.

<Specific Example of Process by Recomputation Scheduler Function>

Next, a specific example of a process by the recomputation scheduler function 1200 will be described. Here, a specific example of a schedule generation process in which the generation unit 1210 sets the recomputation process or the like to generate a schedule will be described by specifying a "state" that is the source of the initial schedule based on the computation graph.

Figure 13:
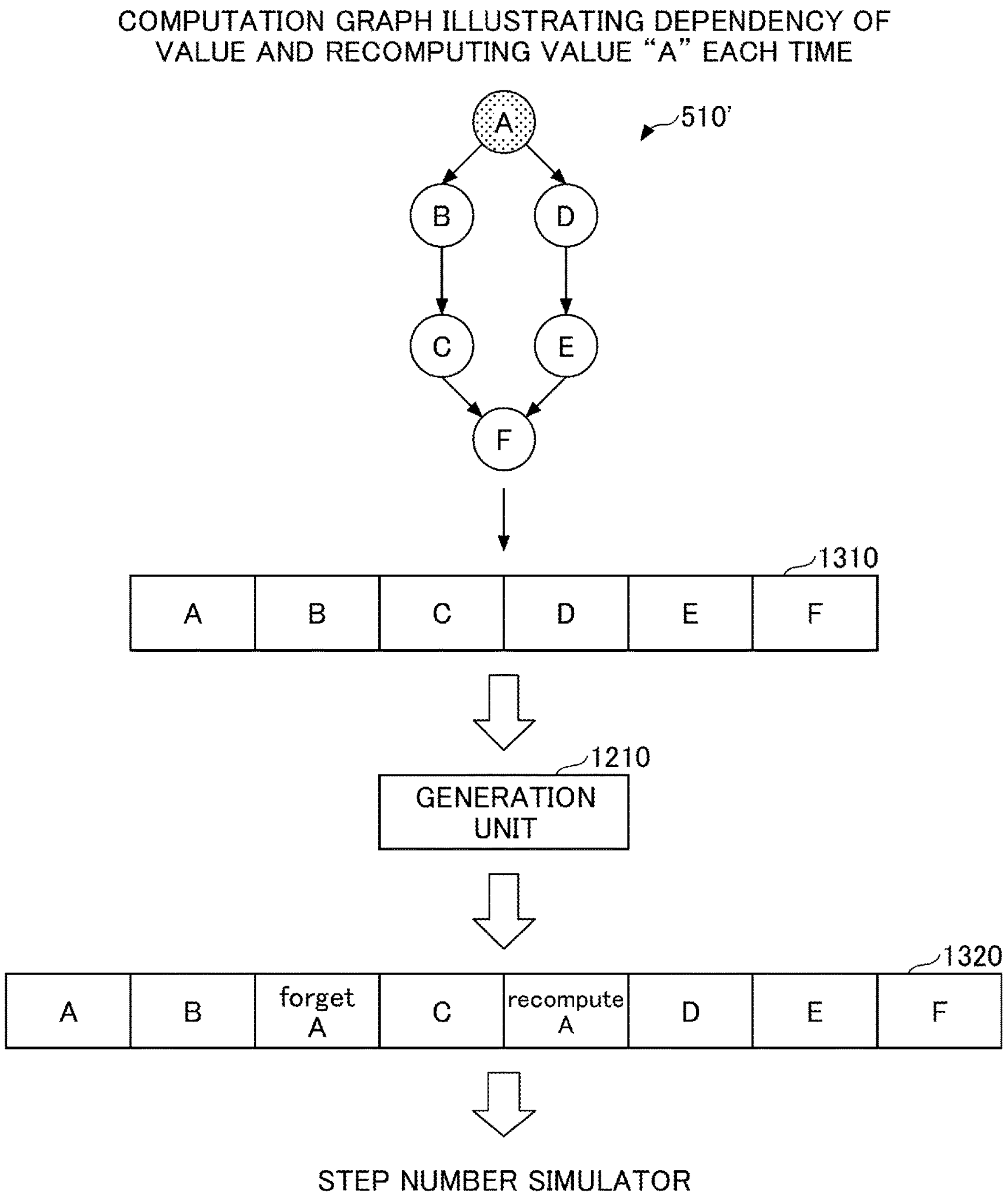
FIG. 13 is a second diagram illustrating a specific example of the schedule generation process by the generation unit.

FIG. 13 is a second diagram illustrating a specific example of the schedule generation process by the generation unit. The example of FIG. 13 illustrates that the generation unit 1210 specifies the computation order and information indicating a value to be recomputed when it does not exist in the first memory as a state 1310 based on the computation graph indicated by the reference numeral 510', sets the recomputation process based on the specified state 1310 to generate a schedule 1320, and notifies the generated schedule 1320 to the step number simulator.

Specifically, in the example of FIG. 13, the computation graph (reference numeral 510') indicating that the dependency of values and the value "A" are the values to be recomputed when they do not exist in the first memory is notified. Also, the example of FIG. 13 indicates that, as the state 1320, based on the computation graph indicated by the reference numeral 510', the value "A" is computed first, the value "B" is computed based on the value "A", the value "C" is computed based on the value "B", the value "D" is computed after the value "A" is recomputed, the value "E" is computed based on the value "D", and the value "F" is computed based on the value "C" and the value "E".

In the example of FIG. 13, the generation unit 1210 generates the schedule 1320 by setting a deletion process that deletes the value "A" without saving it to the second memory after the value "B" is computed and setting the recomputation process of the value "A" before the value "D" is computed.

SUMMARY

As is clear from the above description, the compiler device 140 according to the second embodiment, may function as a scheduling apparatus that generates a schedule of computations, including the computation order of the computations performed on the chip 180_1 or the like including a first memory and a second memory. The compiler device 140 according to the first embodiment may generate the schedule from the specified state based on the received information and may calculate or estimates the time required to execute the process including the process of transferring the data from the second memory based on the generated schedule.

In the compiler device 140 according to the second embodiment, generating the schedule may include causing the state to transition such that the process of transferring the data from the second memory is replaced with a recomputation process for acquiring the data.

As described above, the compiler device 140 according to the second embodiment may generate a schedule by replacing the transfer process from the second memory with a recomputation process in consideration of the configuration where the access to the second memory takes a long time.

Thus, according to the compiler device 140 according to the second embodiment, as in the first embodiment, a schedule can be generated according to the configuration of the device in which the machine code is executed.

Third Embodiment

In the first and second embodiments described above, the compiler device 140 is disposed within the server device 120. However, the compiler device 140 may be configured separately from the server device 120. In the first embodiment, the conversion unit 410 is described as being implemented in the compiler device 140. However, the conversion unit 410 may be implemented, for example, in the terminal device 110. Alternatively, the conversion unit 410 may be implemented in other external devices other than the terminal device 110 (for example, other server devices).

In the first and second embodiments described above, the computation graph is generated by executing the source code 230 and converting it into the ONNX format. However, a method of generating the computation graph is not limited thereto, and the computation graph may be generated by other methods.

Further, the "state" described in the first and second embodiments is only one example, and a "state" different from the "state" described in the first and second embodiments may be used.

In the above-described first and second embodiments, for example, the chip 180_1 includes four third hierarchical blocks in the hierarchy Level A and includes four second hierarchical blocks in the hierarchy Level B (i.e., FIG. 2). However, the number of blocks (memories) and hierarchies (depth) is not limited and may be modified.

Further, in the first and second embodiments, the hierarchy Level A is the third hierarchical block, the hierarchy Level B is the second hierarchical block, and the hierarchy Level C is the first hierarchical block. However, the definition of each hierarchy is not limited. For example, the hierarchy Level A may be a chip, the hierarchy Level B may be a third hierarchical block, the hierarchy Level C may be a second hierarchical block, and the hierarchy Level D may be a first hierarchical block. Further, the hierarchy Level A may be a chip and a third hierarchy block, the hierarchy Level B may be a second hierarchy block, and the hierarchy Level C may be a first hierarchy block.

The hierarchy to which the memory belongs is not limited to the lowest hierarchy, but may be changed to another hierarchy. The first and second embodiments may also be applied by defining hierarchies such as the structure that bundles top hierarchy level memory (for example, the chips), the structure that bundles the chips (for example, node), and the structure that bundles the nodes.

Also, although the first and second embodiments above did not refer to the application of the server device 120, the server device 120 may function, for example, as a training device used in the training of a machine learning model. In this case, the scheduled computations include the computations during the training of the machine learning model. Since the training of machine learning models often uses the results of past computations, the present disclosure can efficiently train a machine learning model and obtain a trained machine learning model.

Other Embodiments

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-bb, and a-a-b-b-c-c. Further, the addition of another element other than the listed elements (i.e., a, b, and c), such as adding d as a-b-c-d, is included.

In the present specification (including the claims), if the expression such as "data as an input", "based on data", "according to data", or "in accordance with data" (including similar expressions) is used, unless otherwise noted, a case in which various data themselves are used as an input and a case in which data obtained by processing various data (e.g., data obtained by adding noise, normalized data, and intermediate representation of various data) are used as an input are included. If it is described that any result can be obtained "based on data", "according to data", or "in accordance with data", a case in which the result is obtained based on only the data are included, and a case in which the result is obtained affected by another data other than the data, factors, conditions, and/or states may be included. If it is described that "data are output", unless otherwise noted, a case in which various data themselves are used as an output is included, and a case in which data obtained by processing various data in some way (e.g., data obtained by adding noise, normalized data, and intermediate representation of various data) are used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general-purpose processor, the processor may have a hardware configuration that can perform the operation B and be configured to actually perform the operation B by setting a permanent or temporary program (i.e., an instruction). If the element A is a dedicated processor or a dedicated arithmetic circuit, a circuit structure of the processor may be implemented so as to actually perform the operation B irrespective of whether the control instruction and the data are actually attached.

In the present specification (including the claims), if a term indicating containing or possessing (e.g., "comprising/including" and "having") is used, the term is intended as an open-ended term, including an inclusion or possession of an object other than a target object indicated by the object of the term. If the object of the term indicating an inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, states, and/or the like, and that the advantage/result is not necessarily obtained by the configuration. The advantage/result is merely an advantage/result that results from the configuration described in the embodiment when various factors, conditions, states, and/or the like are satisfied, and is not necessarily obtained in the claimed invention that defines the configuration or a similar configuration.

In the present specification (including the claims), if terms such as "optimize/optimize" are used, such terms should be interpreted as appropriate, according to a context in which the terms are used, including determining a global optimization, finding an approximate global optimization, finding a local optimization, and finding an approximate local optimization. The meaning also includes determining an approximate value of such an optimal value stochastically or heuristically.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression such as "one or more hardware perform a first process and the one or more hardware perform a second process" is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data.

Although the embodiments of the present disclosure have been described in detail above, the present disclosure is not limited to the individual embodiments described above. Various additions, modifications, substitutions, partial deletions, and the like may be made without departing from the conceptual idea and spirit of the invention derived from the contents defined in the claims and the equivalents thereof. For example, in all of the embodiments described above, numerical values or mathematical expressions used for description are presented as an example and are not limited to them. Additionally, the order of respective operations in the embodiment is presented as an example and is not limited thereto.

What is claimed is:

1. A scheduling apparatus for generating a schedule, the scheduling apparatus comprising:

one or more processors; and one or more memories storing one or more instructions that, when executed by the one or more processors, cause the one or more processors to:

generate a first schedule including one or more data transfer processes involving at least one memory of a data processing device;

generate a plurality of second schedules, each of which is generated by replacing at least one of the one or more data transfer processes included in the first schedule with one or more recomputation processes;

calculate, for each of the plurality of second schedules, a value related to an execution time required for the data processing device to execute a corresponding one of the plurality of second schedules; and select a schedule from a plurality of schedules including at least the plurality of second schedules based on the value calculated for each of the plurality of second schedules.

2. The scheduling apparatus according to claim 1, wherein the execution time is represented by a number of steps required for execution.

3. The scheduling apparatus according to claim 1, wherein the one or more instructions that, when executed by the one or more processors, further cause the one or more processors to calculate the value using a simulator.

4. The scheduling apparatus according to claim 1, wherein the one or more instructions that, when executed by the one or more processors, further cause the one or more processors to generate the plurality of second schedules using a metaheuristic algorithm.

5. The scheduling apparatus according to claim 4, wherein the metaheuristic algorithm includes at least one of a simulated annealing method, a hill climbing method, or a Metropolis method.

6. The scheduling apparatus according to claim 1, wherein the at least one memory of the data processing device comprises a memory having a hierarchical structure.

7. The scheduling apparatus according to claim 1, wherein the at least one memory of the data processing device is not a dynamic random access memory (DRAM).

8. The scheduling apparatus according to claim 1, wherein the at least one memory of the data processing device is a dynamic random access memory (DRAM).

9. The scheduling apparatus according to claim 1, wherein the plurality of second schedules are generated based on the first schedule.

10. The scheduling apparatus according to claim 9, wherein the one or more instructions that, when executed by the one or more processors, further cause the one or more processors to generate the plurality of second schedules by:

calculating a value related to an execution time required for the data processing device to execute the first schedule; and generating the plurality of second schedules based on the calculated value of the first schedule.

11. The scheduling apparatus according to claim 1, wherein each of the one or more recomputation processes is a process of recalculating data.

12. The scheduling apparatus according to claim 1, wherein the one or more instructions that, when executed by the one or more processors, further cause the one or more processors to select the schedule by selecting a schedule having a minimum execution time from the plurality of second schedules.

13. The scheduling apparatus according to claim 1, wherein the selected schedule is for processing a machine learning model.

14. A method for scheduling a computation order to be executed in a data processing device having at least one memory, the method comprising:

generating, by at least one processor, a first schedule including one or more data transfer processes involving the at least one memory;

generating, by the at least one processor, a plurality of second schedules, each of which is generated by replacing at least one of the one or more data transfer processes included in the first schedule with one or more recomputation processes;

calculating, by the at least one processor, for each of the plurality of second schedules, a value related to an execution time required for the data processing device to execute a corresponding one of the plurality of second schedules; and selecting, by the at least one processor, a schedule from a plurality of schedules including at least the plurality of second schedules based on the value calculated for each of the plurality of second schedules.

15. The method according to claim 14, wherein the calculating of the value is performed by a simulator.

16. The method according to claim 14, wherein the at least one memory comprises a memory having a hierarchical structure.

17. The method according to claim 14, wherein the at least one memory is not a dynamic random access memory (DRAM).

18. A non-transitory computer-readable storage medium storing a program which, when executed by at least one processor, causes the at least one processor to perform a process comprising:

generating a first schedule including one or more data transfer processes involving at least one memory of a data processing device;

generating a plurality of second schedules, each of which is generated by replacing at least one of the one or more data transfer processes included in the first schedule with one or more recomputation processes;

calculating, for each of the plurality of second schedules, a value related to an execution time required for the data processing device to execute a corresponding one of the plurality of second schedules; and selecting a schedule from a plurality of schedules including at least the plurality of second schedules based on the value calculated for each of the plurality of second schedules.

19. The non-transitory computer-readable storage medium according to claim 18, wherein the calculating of the value is performed by a simulator.

20. The non-transitory computer-readable storage medium according to claim 18, wherein the at least one memory comprises a memory having a hierarchical structure.

* * * * *